UNITED STATES PATENT OFFICE.

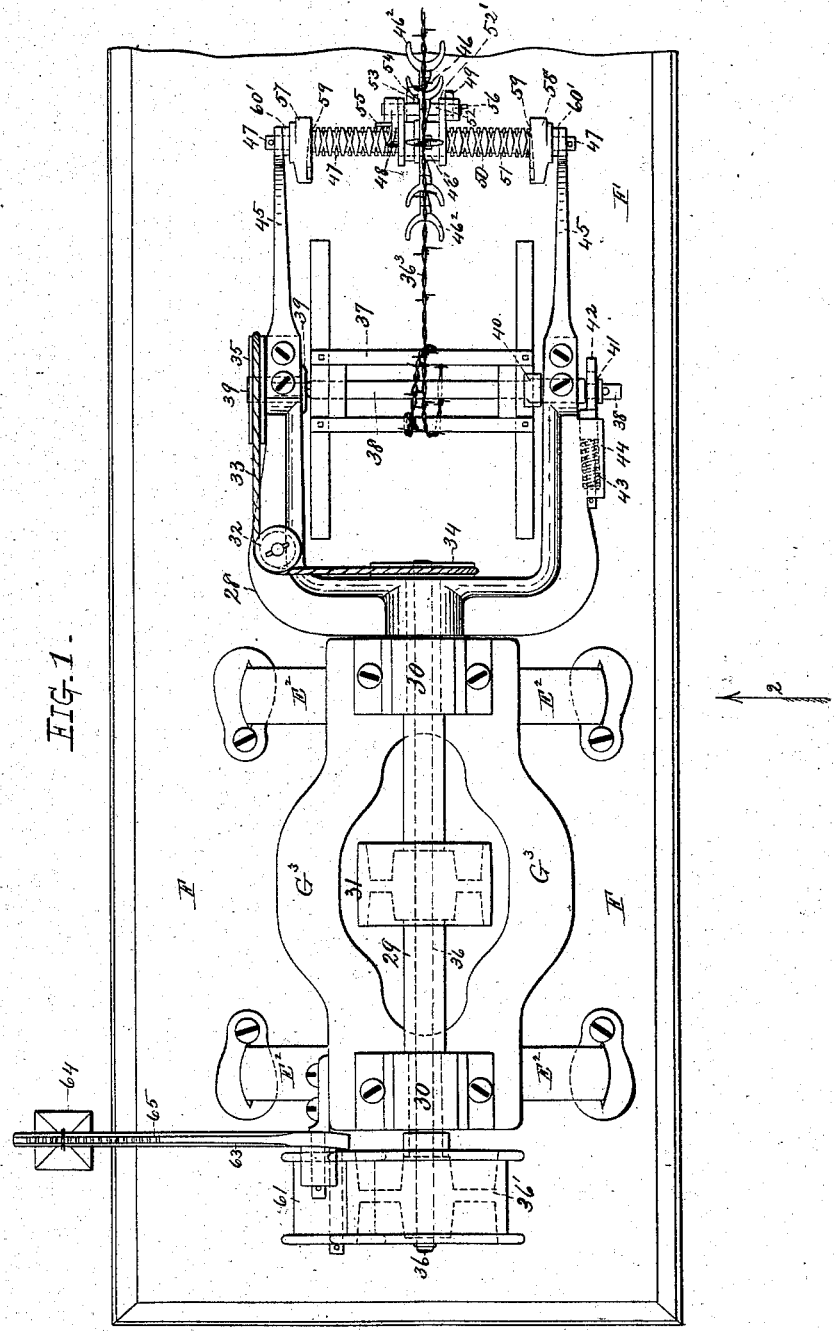

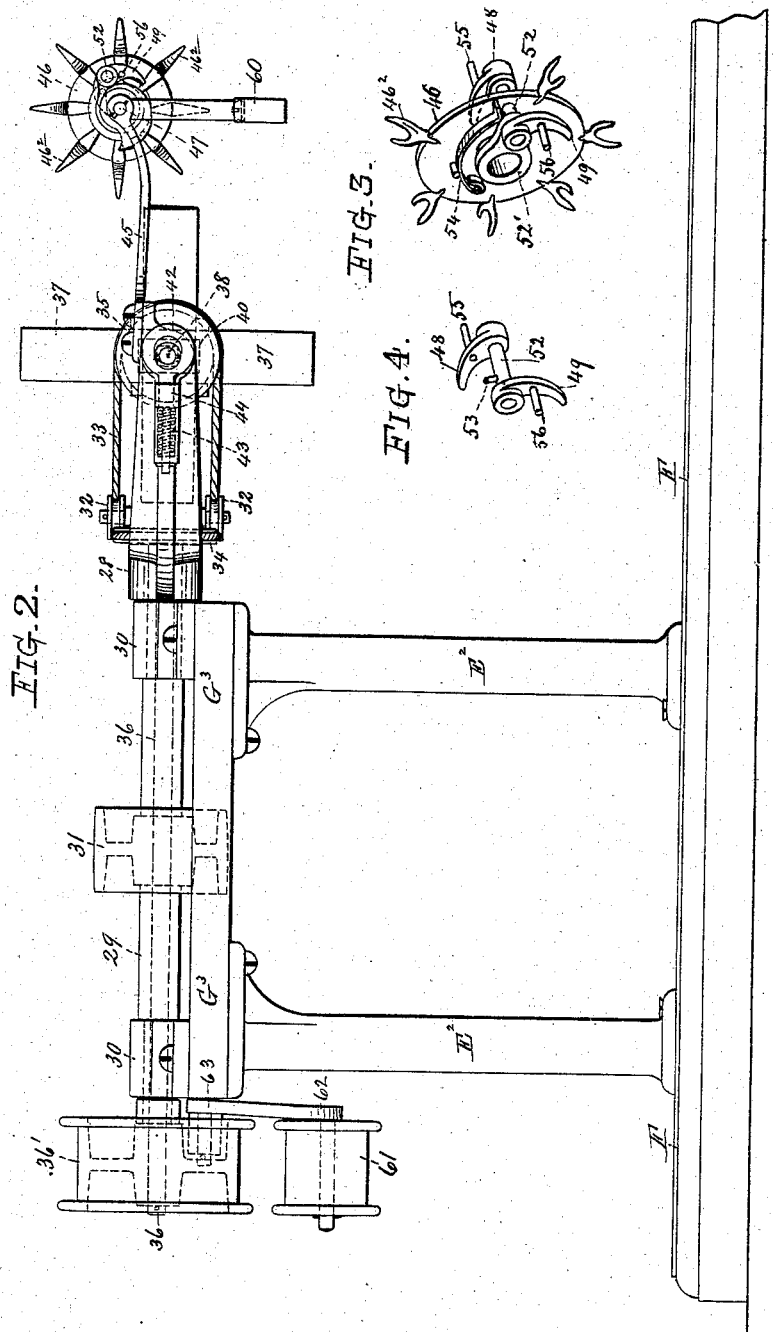

DANIEL C. STOVER, OF FREEPORT, ASSIGNOR TO I. L. ELWOOD & CO., OF DE KALB, ILLINOIS.

TWISTING AND SPOOLING MACHINE.

SPECIFICATION forming part of Letters Patent No. 241,747, dated May 17, 1881.

Application filed December 1, 1880. (No model.)

*To all whom it may concern:*

Be it known that I, DANIEL C. STOVER, of Freeport, in the county of Stephenson and State of Illinois, have invented certain new and useful Improvements in Twisting and Spooling Machines; and I do hereby declare that the following is a full, clear, and exact description of the same, reference being had to the accompanying drawings, forming a part of this specification, and in which—

Figure 1 represents a top or plan view of my said twisting and spooling apparatus. Fig. 2 represents a side view of the parts shown in Fig. 1, looking in the direction indicated by arrow 2. Fig. 3 represents on a larger scale, in perspective, the sprocket-wheel and parts connected therewith; Fig. 4, a detail view of the same.

To enable those skilled in the art to which my invention belongs to make and use the same, I will proceed to describe it more in detail.

This invention, while intended for general use in twisting together two or more wires or other strands and winding the finished product upon spools, is especially useful in the manufacture of barbed-wire fence, and is shown in the drawings as being applied in the fabrication of such article.

The spooler and distributer, although having independent movements, revolve and act in unison with the twister, being attached to the frame-work of the same. The frame 28 of the twister is secured to the end of a hollow shaft, 29, which turns in suitable bearings, 30 30, secured to slotted bed-plate $G^3$, and supported upon standards or supports $E^2$.

Driving-power is imparted to shaft 29 to turn the twister and the operative parts connected therewith by means of a driving-pulley, 31, centrally secured upon tubular shaft 29, around which is passed a belt connected with the main driving-power.

Around grooved pulleys 32 32, which are arranged to turn upon projecting journals secured to spool-frame 28, passes an endless driving band or chain, 33, whereby power is communicated to pulley 35 from pulley 34 upon the end of the spool-shaft 36, which passes through and turns in tubular shaft 29, the shaft 36 being rotated by the pulley 36'.

Spool 37 is supported and held in position upon an adjustable spindle, 38, which is constructed and operated as follows:

Power is imparted to said spindle 38 from pulley 35, which is secured fast to its hub 39 by the end of the spindle being made square and fitting into a square opening formed in said hub, and the spool is held from turning upon the spindle by means of a clamp, 40, which grasps one of the arms of the spool, being prevented from turning upon the spindle by having a square opening through the same, which fits over a square portion at that point of the spindle.

Outside of frame 28, upon spindle 38, is formed a groove, 41, passing entirely around said spindle, into which fits a slotted holding-pin, 42, and held in such position by means of a spiral spring, 43, arranged in the part 44 of frame 28.

When a spool is filled and ready for removal the operator has but simply to press upon the end of holding-pin 42 sufficient to force it out of groove 41, then draw the spindle out, remove the filled spool, and substitute an empty one in its place.

The wire or other distributing device is secured to the ends of arms 45 45, which, in turn, are secured to the forward ends of frame-piece 28. Said device is arranged, constructed, and operates in the following manner:

A sprocket-wheel, 46, is arranged to travel back and forth upon a shaft, 47, being provided with swinging dogs 48 and 49, which travel in right and left handed spiral grooves 50 and 51, cut into the periphery of said shaft 47.

Dogs 48 and 49 are secured to the ends of a short rocking spindle, 52, which rocks in bearings 52' secured to the sprocket-wheel, while a pin, 53, projects from spindle 52, and a spring, 54, secured to the side of the sprocket-wheel, presses against said pin 53, so that when either one of the dogs, 48 or 49, is forced down (they being secured at different angles to spindle 52) the other is forced up, and then held by said spring 54 bearing against pin 53, thereby causing the sprocket-wheel to travel laterally when revolved by the twisted strands or barbed wire as it passes to spool 37, over and in contact with the sprockets $46^2$.

It will be understood that any suitable guiding wheel or pulley may be employed in lieu of a sprocket-wheel.

Dogs 48 and 49 are provided respectively with pins 55 and 56, the purposes of which pins are to throw the dogs up and down alternately, when arriving at the end of each lateral movement back and forth, by coming in contact with the surface of cam 57 or 58, (secured to shaft 47,) as the case may be, thereby reversing the motion of the sprocket-wheel. For instance, as the pin 55 comes in contact with its cam 57 it enters upon the surface of said cam at the point 59, and as the sprocket-wheel continues to revolve and advance toward it the pin is forced up and over the surface of the cam until pin 53 is forced past the holding-point of spring 54, when the latter then quickly forces the dog then in action up out of its groove and the other one down into its groove, and the motion of the sprocket-wheel is thereby reversed, and which reversing operation takes place as the sprocket-wheel reaches each end of grooved shaft 47.

In order that the dogs may be sure to catch and travel in their respective grooves, their lower ends are curved or bent laterally to correspond to the pitch of their respective grooves or threads in shaft 47.

It will be understood that the barrel 46' of the sprocket-wheel 46 is made large enough to easily and freely slide over the right-and-left-handed screw-shaft 47. As the sprocket-wheel and its shaft are not arranged, in this instance, on a line with the center of shaft 36, a counter-balance, 60, is combined therewith, the same being secured to the center of a curved band or plate, the ends 60' of which are secured to the ends of screw-shaft 47 inside of the supporting-arms 45 45.

If desired, in any case, the mechanism for laying the material being spooled may be used in spooling manufactures not twisted, as well as those twisted, and therefore I do not confine myself in the use of this part of my invention to a twister.

As it is necessary to drive pulley 36' upon the end of shaft 36 at varying speeds, in order to keep a uniform tension, or nearly so, upon spool 37 while it is being filled with the barb fence-wire or other manufacture, a friction-pulley, 61, is arranged upon one arm, 62, of a hinged bell-crank lever, 63, while a weight, 64, is arranged upon the long arm 65 of said bell-crank lever, thereby enabling the operator of said machine to adjust the friction upon the belt which drives pulley 36' from time to time, as spool 37 is filled, for the purpose of regulating the tension on the barb fence-wire $36^3$.

Sprocket-wheel 46 is rotated by the action of the strands or barb-wire $36^3$ drawing over the sprocket-arms $46^2$. Consequently said sprocket-wheel is rotated and caused to move from end to end of double screw-shaft 47, thereby guiding the wire so that it will be wound upon spool 37 in an even and uniform manner.

What I claim, and desire to secure by Letters Patent, is—

1. The combination, with a stationary frame and a frame adapted to revolve, of mechanism for laying barbed wire or other twisted strands upon the winding-spool in a uniform manner, and operated solely by the moving strand being spooled in its passage to the spool, substantially as set forth.

2. The combination, with a stationary frame and the frame 28, adapted to revolve, of double screw-shaft 47, sprocket-wheel 46, dogs 48 and 49, rocking spindle 52, pin 53, spring 54, pins 55 and 56, and cams 57 and 58, substantially as and for the purposes set forth.

3. In a machine for spooling, the combination, with a double screw shaft or spindle, of a sprocket-wheel for guiding the strand to be spooled, and mechanism combined with said sprocket-wheel for reversing its motion upon said screw shaft or spindle, as described, whereby the moving strand, acting upon the sprocket-wheel, serves to lay itself in a uniform manner upon the spool, substantially as specified.

DANIEL C. STOVER.

Witnesses:
 A. T. GREEN,
 W. W. ROBEY.